United States Patent
Gonin

(10) Patent No.: US 8,235,433 B2
(45) Date of Patent: Aug. 7, 2012

(54) BUMPER SHIELD FOR A MOTOR VEHICLE

(75) Inventor: Vincent Gonin, Saint Cyr sur Loire (FR)

(73) Assignee: Faurecia Bloc Avant (FR)

( * ) Notice: Subject to any disclaimer, the term of this patent is extended or adjusted under 35 U.S.C. 154(b) by 0 days.

(21) Appl. No.: 13/087,913

(22) Filed: Apr. 15, 2011

(65) Prior Publication Data

US 2011/0193355 A1 Aug. 11, 2011

Related U.S. Application Data

(63) Continuation of application No. 12/948,976, filed on Nov. 18, 2010, now abandoned.

(30) Foreign Application Priority Data

Nov. 20, 2009 (FR) ...................................... 09 58237

(51) Int. Cl.
*B60R 19/26* (2006.01)
*B60R 19/44* (2006.01)

(52) U.S. Cl. .......................... 293/120; 293/132; 293/142

(58) Field of Classification Search .................. 293/120, 293/133, 102, 132, 134, 142, 155; 296/193.09, 296/187.09, 187.04; 188/377, 371; *B60R 19/26, B60R 19/44*
See application file for complete search history.

(56) References Cited

U.S. PATENT DOCUMENTS

| | | | | |
|---|---|---|---|---|
| 5,271,473 A | * | 12/1993 | Ikeda et al. | 180/68.4 |
| 5,348,114 A | * | 9/1994 | Yamauchi | 180/291 |
| 5,358,304 A | * | 10/1994 | Kanemitsu et al. | 296/193.09 |
| 5,425,561 A | * | 6/1995 | Morgan | 293/120 |
| 6,286,879 B1 | * | 9/2001 | Haque et al. | 293/120 |
| 6,634,702 B1 | * | 10/2003 | Pleschke et al. | 296/187.04 |
| 2007/0144851 A1 | | 6/2007 | Ginja et al. | |

FOREIGN PATENT DOCUMENTS

| | | |
|---|---|---|
| EP | 1293389 | 3/2003 |
| FR | 2896222 | 7/2007 |
| WO | WO 2007/074300 | 7/2007 |

OTHER PUBLICATIONS

Search report issued in application No. FR 0958237 (2010).

* cited by examiner

*Primary Examiner* — Glenn Dayoan
*Assistant Examiner* — Sunsurraye Westbrook
(74) *Attorney, Agent, or Firm* — Barnes & Thornburg LLP

(57) ABSTRACT

The bumper shield for a motor vehicle comprising two main longitudinal members (12), two auxiliary longitudinal members (16) positioned at a lower height, as well as supporting and attachment plates (20) positioned between the ends of the longitudinal members (12, 16), is a single integral piece in plastic material and is formed of two uprights (28) and an upper beam (24) connecting the uprights (28), the uprights (28) being configured so as to bear upon the plates (20) so as to act as impact absorbers, the shield (8) having the shape of an H or an inverted U given by the uprights (28) and the upper beam (24).

20 Claims, 4 Drawing Sheets

BUMPER SHIELD FOR A MOTOR VEHICLE

CROSS REFERENCE TO RELATED APPLICATIONS

This patent application is a Continuation of co-pending U.S. patent application Ser. No. 12/948,976, filed Nov. 18, 2010, which claims priority to French Patent Application No. FR0958237, filed Nov. 20, 2009. The disclosures set forth in the referenced applications are incorporated herein by reference in their entireties.

BACKGROUND

The present disclosure relates to a bumper shield for a motor vehicle comprising two main longitudinal members, two auxiliary longitudinal members positioned at a lower height, as well as supporting and attachment plates positioned between the ends of the longitudinal members.

Modem motor vehicles are designed in order to suitably respond to different types of possible front impacts, such as low-speed impacts or «parking impacts», for a speed comprised between 2.5 and 4 km/h (ECE42), medium-speed impacts or «reparability impacts», for a speed of about 16 km/h (Danner) and high-speed impacts, for a speed comprised between 56 and 65 km/h.

Modem motor vehicles are also designed in order to protect pedestrians in the case of an impact with a pedestrian, and in particular for protecting the legs and the hip of the pedestrian.

It is possible to provide a front assembly comprising an upper bumper beam made of metal attached to the ends of front main longitudinal members of a high track (main rails) via first metal impact absorbers added onto the upper bumper beam, and a lower bumper beam attached to the ends of front auxiliary longitudinal members (for example cradle extensions) via second metal or plastic material impact absorbers, added on the lower bumper beam.

However, such a front assembly is complicated and costly to manufacture and to install.

SUMMARY

An object of the disclosure is to propose a bumper shield that suitably responds to pedestrian impacts and to low and medium speed impacts, while being simple and having low manufacturing cost.

For this purpose, the disclosure proposes a bumper shield of the aforementioned type, characterized in that it is a single integral piece in plastic material and formed of two uprights and an upper beam connecting the uprights, the uprights being configured in order to bear upon the plates so as to act as impact absorbers, the shield having the shape of an H or an inverted U given by the uprights and the upper beam.

According to other embodiments, the bumper shield comprises one or more of the following features, taken separately or according to any technical possible combinations:

the upper beam is substantially at the height of the main longitudinal members;

the upper beam is positioned at a height substantially different from that of the main longitudinal members;

the uprights have a thickness comprised between 120 and 220 mm;

the uprights have a cellular structure formed with cells extending longitudinally through the uprights and opening onto the rear and/or front face of the shield;

each upright comprises first blind cells, closed on the rear face side and open on the front face side, and second blind cells open on the rear face side and closed on the front face side;

the upper bumper beam is double and comprises two vertically spaced cross members; and the bumper shield comprises at least one pedestrian absorption rib protruding outwards from an upright.

An object of the disclosure is also a motor vehicle bumper assembly of the type comprising two main longitudinal members and two auxiliary longitudinal members positioned at a lower height, and supporting and attachment plates positioned at the ends of the longitudinal members, which assembly comprises a bumper shield as defined above, the uprights being attached and rigidly bearing against the plates.

According to other embodiments, the assembly according to the disclosure comprises one or more of the following features, taken separately or according to any technically possible combinations:

the uprights are attached to the plates by screwing and/or adhesive bonding;

the assembly as defined above comprises two plates, each plate connecting a main longitudinal member and an auxiliary longitudinal member and extending over the whole of the height separating the main longitudinal member from the auxiliary longitudinal member, each upright being applied on the common plate substantially along the whole of its height;

the assembly further comprises a lower beam extending transversely between the auxiliary longitudinal members and distinct from the bumper shield;

a pedestrian absorption rib extends laterally in order to be applied onto the upper beam;

the assembly is a motor vehicle front bumper assembly; and the assembly is a motor vehicle rear bumper assembly.

The disclosure and its advantages will be better understood upon reading the following description, only given as an example, and made with reference to the appended drawings, wherein:

DETAILED DESCRIPTION

Subsequently, the orientation terms are understood with reference to the usual orientation of motor vehicles, illustrated in FIG. 1 by the arrow S directed horizontally forwards along a longitudinal direction of the motor vehicle.

Figure 1:
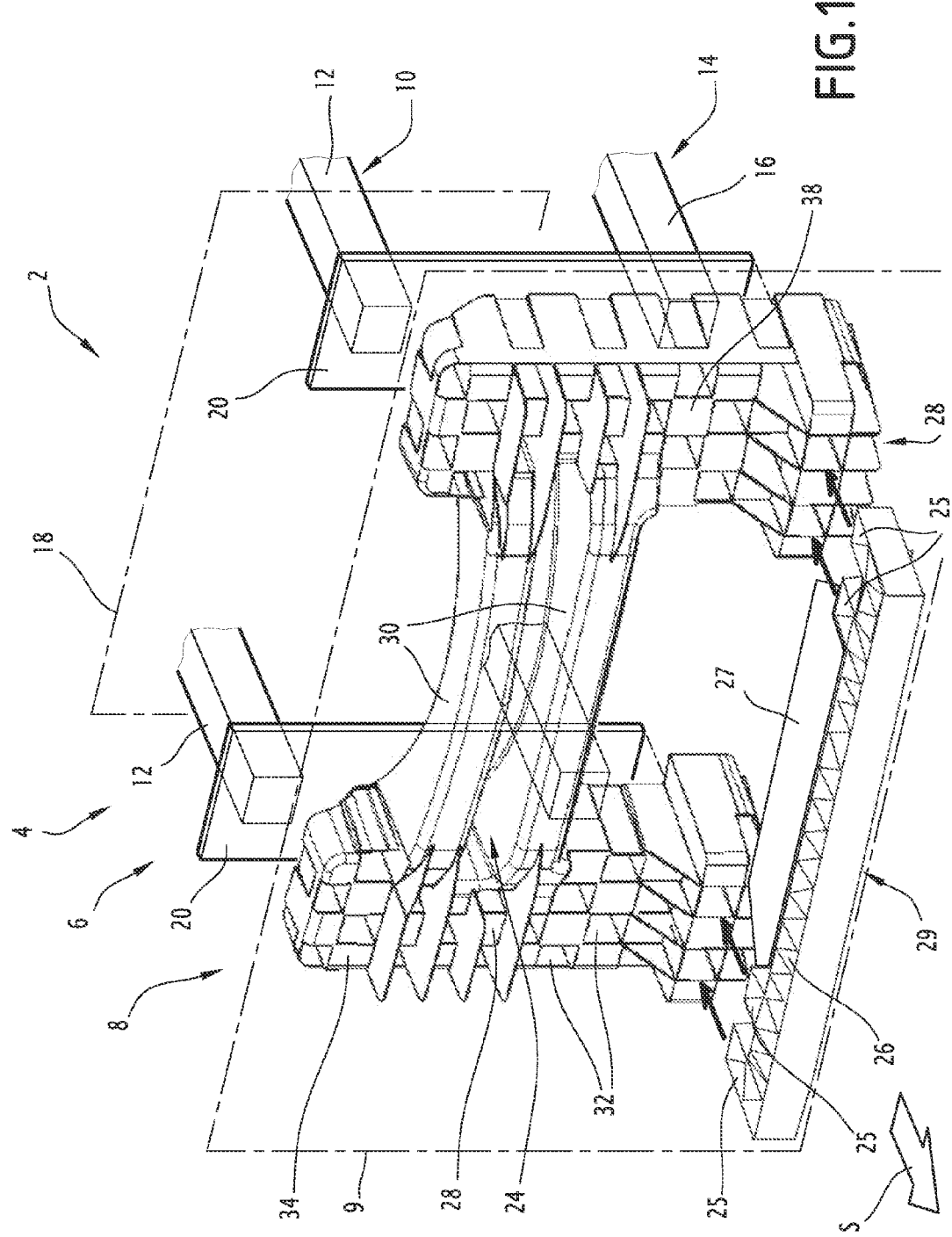
FIG. 1 is a schematic exploded perspective view of a front bumper assembly according to the disclosure.
Figure 2:
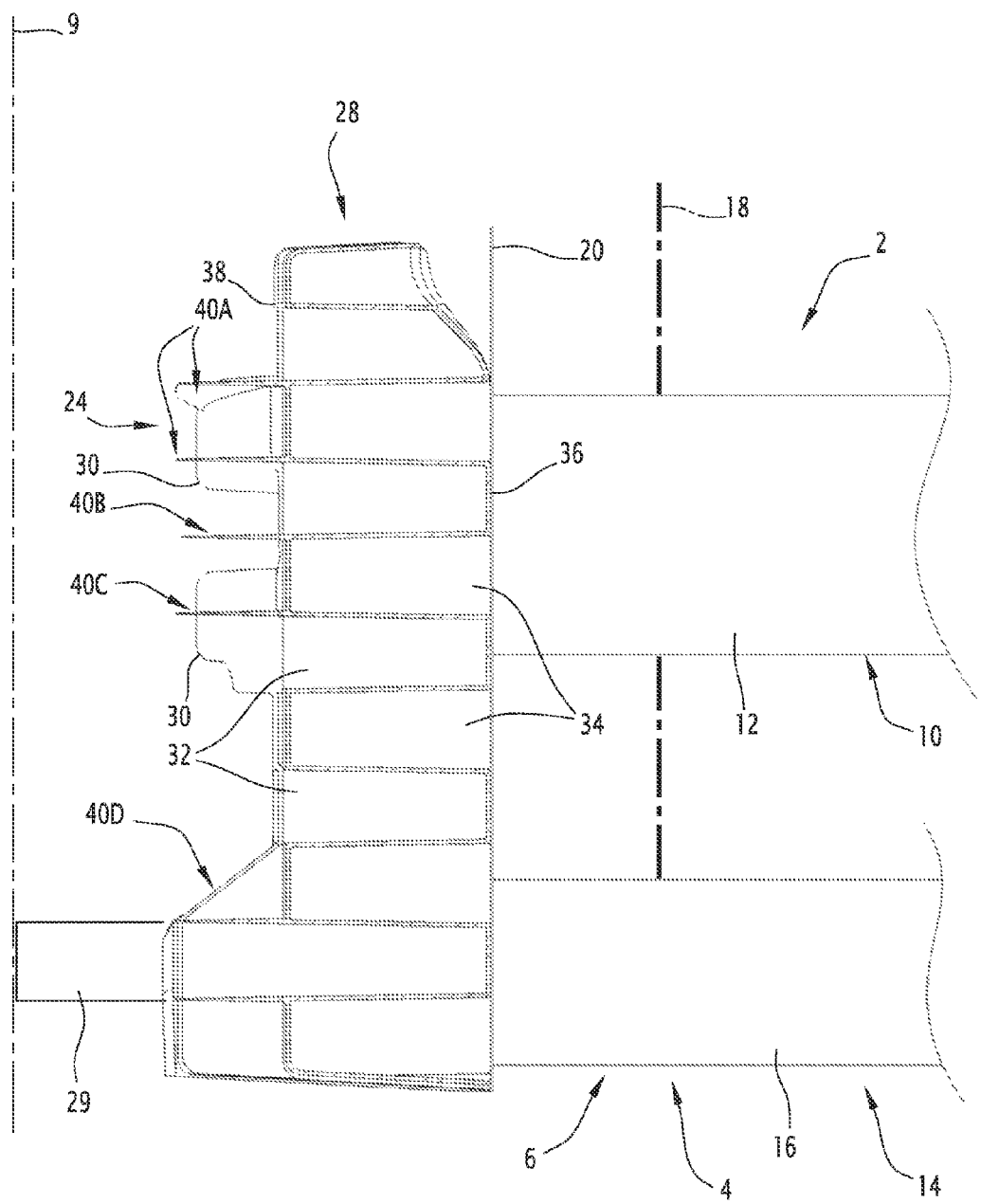
FIG. 2 is a side sectional view of the assembly of FIG. 1.
Figure 3:
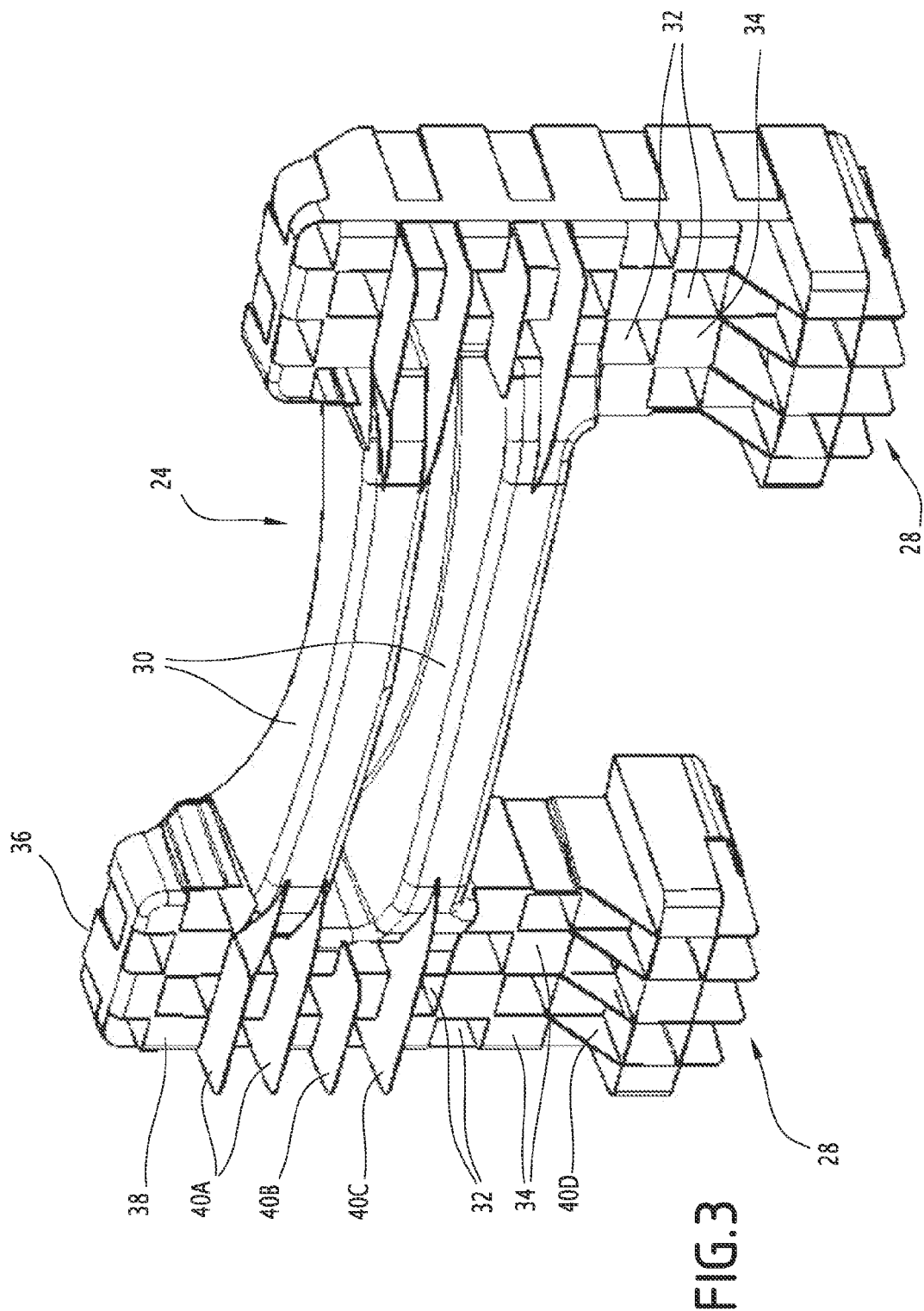
FIG. 3 is a three-quarter front perspective view of a front bumper shield of the assembly of FIGS. 1 and 2.

As illustrated in FIGS. 1 and 2, a motor vehicle 2 comprises a chassis 4 comprising a front portion 6, a front bumper shield 8 positioned at the front end of the front portion 6 in order to protect the front portion 6 in the case of an impact, and a bumper skin 9 for covering the shield 8.

The front portion 6 comprises a high track 10 comprising a pair of main longitudinal members 12 and a low track 14 comprising a pair of auxiliary longitudinal members 16.

The main longitudinal members 12 are also called rails.

According to an embodiment of the disclosure, the auxiliary longitudinal members 16 are cradle extensions, extending forwards from a cradle attached between the longitudinal members 16, for example an engine cradle.

The auxiliary longitudinal members 16 are located at a lower height than that of the main longitudinal members 12. They are positioned below the main longitudinal members 12, substantially in the same longitudinal plane.

The main longitudinal members 12 extend longitudinally and are spaced apart from each other in the transverse direction.

The auxiliary longitudinal members 16 extend longitudinally and are spaced apart from each other in the transverse direction. The transverse distance between the auxiliary longitudinal members 16 is substantially equal to the one between the main longitudinal members 12.

The main longitudinal members 12 are calibrated in order to take without any buckling a maximum axial force comprised between 80 kN and 100 kN. The auxiliary longitudinal members 16 are calibrated in order to take without any buckling a maximum axial force comprised between 25 kN and 45 kN. On some vehicles with non-average size, the proposed calibration ranges may be slightly different, without departing from the scope of the disclosure.

The main longitudinal members 12 are provided in order to receive between them and to at least partly support a front face 18. The front face 18 is illustrated in FIG. 1 schematically by a rectangle in dot and dash lines. In a known way, the front face 18 comprises a supporting frame bearing functional units of a system for cooling the power train of the vehicle and/or of an air-conditioning system, such as one or more radiators or an electric fan unit.

The front face 18 is attached to the main longitudinal members 12 and to the wing longitudinal members supporting the wings of the body, and located above the main longitudinal members 12 and set back rearwards relatively to the main longitudinal members 12.

The front face 18 is set back towards the rear of the front ends of the main 12 and auxiliary 16 longitudinal members.

The front portion 6 comprises a pair of attachment plates 20 positioned at the front ends of the main 12 and auxiliary 16 longitudinal members. Each plate 20 connects the front end of a main longitudinal member 12 to that of the adjacent auxiliary longitudinal member 16 located on the same side. Each plate 20 presents itself as a metal plate extending in a substantially vertical transverse plane. The plates 20 may be made of pressed, rolled, folded steel or further in a light alloy.

The skin 9 is a front body element of the vehicle and defines the outer curve of the vehicle.

The shield 8 is positioned between the skin 9, by which it is covered, and the front portion 6. It has the function of absorbing energy from low-speed impacts and medium-speed impacts (Danner) so as to preserve the chassis 4 and to protect a pedestrian in the case of a pedestrian impact.

The shield 8 is positioned at the front ends of the main 12 and auxiliary 16 longitudinal members while being attached and longitudinally rigidly bearing directly against the plates 20 without any interposition of an additional energy absorbing element in the case of an impact. The shield 8 is positioned in front of the front face 18 so as to protect it, as well as the functional units which it bears.

The shield 8 is a single integral piece in plastic material and is formed of an upper bumper beam 24 located at the height of the high track 10 and of two uprights 28 connected together through the bumper beam 24. The shield 8 has the shape of an H or an inverted U, given by the uprights 28 and the upper bumper beam 24. The uprights 28 extend downwards from the side ends of the upper beam 24.

The vehicle 2 further comprises a lower bumper beam 29, extending substantially transversely and horizontally facing the lower portion of the uprights 28 and distinct from the shield 8.

According to an embodiment, the lower bumper beam 29 is made in one-piece with the skin 9 in the same material.

Alternatively, the lower bumper beam 29 comprises at its side ends attachment tabs 25, capable of rigidly fitting into the lower portion of the uprights 28. The central portion 26 of the beam 29 is designed so as to operate in flexion in response to an impact. The lower beam 29 also includes an air channelling plate 27 extending horizontally rearwards from the central portion 26 between the uprights 28 and substantially perpendicular to the latter.

The upper bumper beam 24 extends substantially transversely and horizontally between the uprights 28. It has the function of channelling the energy of an impact towards the uprights 28 in the case of a collision.

The upper bumper beam 24 is intended to impact the leg of a pedestrian substantially at the height of the knee. The upper beam 24 is adapted to essentially operate in flexion in the case of an impact on the upper beam 24.

The vertical amplitude of the upper bumper beam 24 is comprised between 100 mm and 200 mm, preferably between 120 mm and 150 mm, which represents a 30% to 80% increase relatively to the vertical amplitude of the conventional metal upper bumper beams, which have a height conventionally comprised between 70 mm and 90 mm. The result of this is better compatibility with the knee of the pedestrian (reduced shear), because of the lower sensitivity to the dispersion of the pedestrian's body (tibia size) or to the attitude of the vehicle (loading degree, braking attitude). The advantage is identical in the parking impact or low-speed compatibility impact configuration. Advantageously, the lower bumper beam 29 is more rigid and forward relatively to the upper bumper beam 24 in order to ensure suitable protection of the pedestrian.

In this example, the upper bumper beam 24 is double and comprises at least two vertically spaced parallel horizontal members 30. Each member 30 has a U-shaped section which is horizontally open towards the rear. The members 30 increase the inertia in flexion and torsion of the upper bumper beam 24. They may have drafts and especially a sufficient height so that injection and stripping of the shield 8 are facilitated (conventionally, a height comprised between 30 mm and 40 mm). Alternatively, the upper bumper beam 24 comprises a single member.

Figure 4:
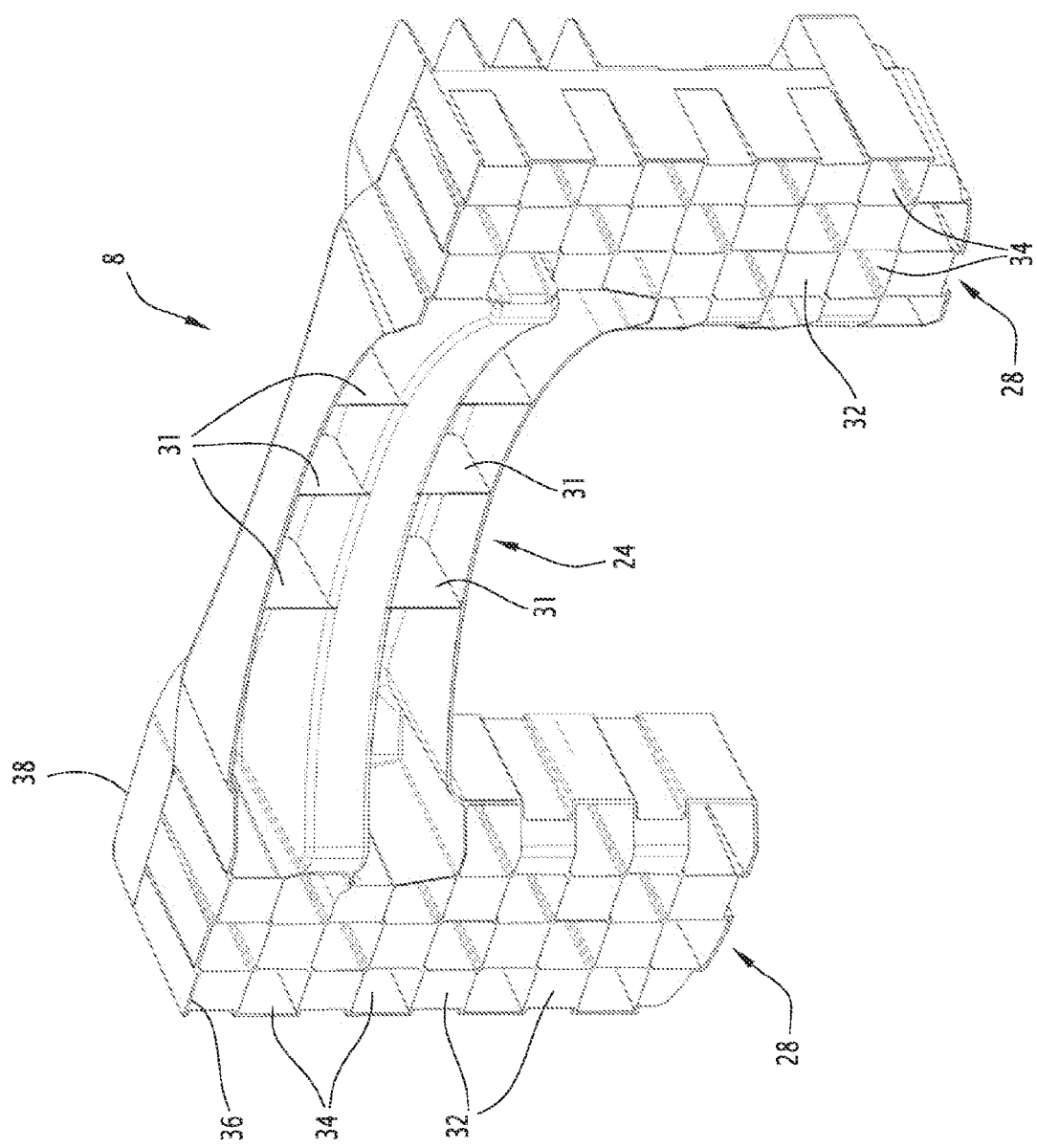
FIG. 4 is a three-quarter rear perspective view of an alternative embodiment of the front bumper shield of the assembly of FIGS. 1 and 2.

In the alternative illustrated in FIG. 4, the bumper shield 8 has the shape of an inverted U.

According to an alternative of the shield 8 with a U or inverted H shape, and as illustrated in the U-shaped alternative of FIG. 4, each member 30 comprises inner longitudinal and vertical stiffening ribs 31 for imparting to the member 30 the desired stiffness. In an advantageous alternative, the ribs present in the members 30 are distributed over the width of these members, so that the density of ribs per unit length when moving along a transverse axis of the vehicle is greater in a central region of the member 30 than in the side regions of the member 30 located on either side of the central region.

Thus, the central region for example extends on either side of the centre of the member 30 over a lateral range of about 200 mm. This central region for example has a number of ribs of more than 4.

The presence of a large number of ribs in this central region allows, in a centered pedestrian impact, after impact of the leg of the pedestrian on this central region, a reduction in the deceleration by pure flexion of the members 30 over a longitudinal travel comprised between 50 mm and 70 mm. This response is radically different from the response of a conventional foam absorber which operates by pure compression over comparable travel.

Each side region extends between the central region and the uprights 28 at a distance comprised for example between 200 mm and 300 mm from the centre of the member 30. The number of ribs in each peripheral region is less than 4. Thus, in a median pedestrian impact, when the leg of the pedestrian impacts this side region, the reduction in the deceleration is accomplished by a combination of localised flexion and compression of this region over a travel close to 50 mm.

The uprights 28 of the shield 8 are designed to act as energy absorbers between the skin 9 and the plates 20, and to absorb the energy of an impact on the shield 8 at low speed or medium speed (Danner). Each upright 28 is designed in order to essentially operate in compression along the direction of the impact, here the longitudinal direction of the vehicle.

Thus, the uprights 28 are capable of being attached and rigidly bearing directly against the plates 20, without interposing additional impact absorbers added between the uprights 28 and the plates 20.

For a motor vehicle having a mass comprised between 800 and 1,200 kg, the energy to be dissipated in the case of a medium-speed impact (Danner) is generally comprised between 6 and 12 kJ, advantageously between 7kJ and 10kJ. Preferably, each upright 28 is designed in order to absorb an energy of more than 5 kJ in the case of medium-speed impact (Danner), preferably comprised between 6 and 10 kJ.

Each upright 28 has a cellular structure comprising cells 32, 34 extending longitudinally between a rear face 36 and a front face 38 of the uprights 28.

Each upright 28 comprises inverted blind cells comprising first blind cells 32 closed on the rear face side 36 and open on the front face side 38, and second blind cells 34 open on the rear face side 36 and closed on the front face side 38. The first cells 32 and the second cells 34 are positioned in staggered rows (or as on a checkerboard).

Each upright 28 is directly attached onto the corresponding plate 20, in contact and longitudinally rigidly bearing against the plate 20. Each upright 28 covers the major portion of the supporting surface provided by the corresponding plate 20.

Each upright 28 is attached on the corresponding plate 20 by screwing or adhesive bonding.

This second solution is advantageous, insofar as it allows a good distribution of the forces. Indeed, the design constraints linked to the assembling by screwing (metal inserts, holes, stiffening soles, spaces for screw guns . . . ) are lifted, while the localized stresses and risks of tearing caused by the screwing are very strongly attenuated. Further, the selected geometry formed of inverted blind cells positioned in staggered rows considerably increases the gluing surface at the rear of the uprights 28 and participates in the favorable distribution of the forces.

The plates 20 of great height, or giant plates, connecting each main longitudinal member 12 to an auxiliary longitudinal member 16, allow spreading the distribution of the stresses absorbed by the shield 8 and the lower bumper beam 29 over a significant height in the vehicle, by means of the uprights 28 extending between the high 10 and low 14 tracks.

The giant plates 20 provide a rigid supporting surface extended to the uprights 28, which allows the uprights 28 to uniformly operate in compression in the case of an impact, without any flexion in their median portion located vertically between the high track 10 and the low track 14. This asset allows a homogeneous design of the uprights 28, with analogous cells uniformly spread out, which may be removed from the mold along the longitudinal direction and which are intended to essentially operate in compression. The architecture therefore radically differs from structures without giant plates, in which the uprights have to have a design intended for an operation in flexion.

Consequently, the vehicle provided with a front assembly according to the disclosure is less intrusive when it enters into contact with another vehicle, which is a benefit to intervehicular compatibility at low and medium speed.

The size of the support provided by the plates 20 is advantageously comprised between 100 and 180 mm in width and between 350 and 450 mm in height, which corresponds to surface areas globally comprised between 3.5 and 8 dm2.

The cellular structure of the uprights 28 facilitates manufacturing and imparts to the uprights a sufficient energy absorption capacity over a small depth (the dimension along the longitudinal direction).

The shield 8 is obtained as a single integral piece for example by injection molding of plastic material. It may be removed from the mold along a single direction corresponding to the longitudinal direction of the motor vehicle when the shield 8 is attached on the chassis 4. Thus, the shield 8 may be obtained simply, with low manufacturing cost. The cellular structure of the uprights 28 allows small or even zero drafts which limits the weight and the manufacturing cost of the shield 8. The obtained parts are therefore lightweight and show savings in material.

The cellular structure of the uprights 28 also allows reduction of the local thicknesses of walls delimiting the cells 32, 34. Thus, this local thickness may be reduced in a range comprised between 2.5 and 4 mm, advantageously comprised between 3 mm and 3.5 mm.

Further, and generally, the removal of the single-piece shield 8 from the mold is facilitated since the small drafts or their absence allows its removal from the mold by the movement of two opposite half-molds in opposite directions along an axis corresponding to the longitudinal axis of the vehicle. Thus, it is not necessary to provide drawers or mobile portions in the mold.

Further, with the small or non-existent drafts in the uprights 28 having cells arranged as on a checkerboard, uniform stiffness may be obtained upon a longitudinal crush, for example during a medium-speed impact. Thus, it is possible to obtain a plateau of substantially constant force level as a function of displacement, which increases the dissipated energy and decreases the absorption travel, while remaining below the calibration force of the longitudinal members 12, 16 defined above.

The result is that the energy of an impact may be dissipated with reduced travel, and the solution proves to be very compact. This solution is therefore particularly adapted to small-engine vehicles having a longitudinal impact absorption travel of less than 250 mm, and for example less than 200 mm. The uprights 28 have a longitudinal thickness comprised between 120 and 220 mm. This allows efficient energy absorption, while limiting the cantilever of the shield 8 taken between the plates 20 and the front end of the shield 8.

Moreover, in a laterally shifted pedestrian impact, for distances for example located at more than 300 mm from the centre of the members 30, the reduction in deceleration is preferably accomplished by very localized pure compression of the uprights 28 having cells arranged as on a checkerboard over a travel of about 50 mm.

Optionally, the pedestrian impact energy absorption may be ensured by an assembly of ribs 40A, 40B, 40C, 40D made in one piece with the shield 8 in the same material, protruding forwards from the uprights 28 as illustrated in FIG. 1. These ribs 40A, 40B, 40C, 40D fill the space between the skin 9 and the uprights 28.

They are relatively flexible so as to be longitudinally crushed more easily than the uprights 28. They thereby define a first more flexible energy absorption area at the front of each stiffer upright 28. They thereby allow absorption of the energy of a pedestrian impact over a travel close to 50 mm, while remaining below a deceleration of 150 g.

The ribs 40A, 40B, 40C, 40D for example have a small vertical thickness (<3 mm) so as to exhibit adequate flexibility.

As illustrated in FIG. 1, the shield 8 comprises upper ribs 40A at the height of the upper member 30, intermediate ribs 40B, ribs 40C at the height of the lower member 30 and lower ribs 40D.

The ribs 40A to 40C protrude longitudinally and substantially horizontally at the front of the front face 38 of each upright 28 along the whole width of the upright 28.

The upper ribs 40A laterally extend towards the centre of the upper member 30 so as to be applied onto the front surface of the upper member 30 and the ribs 40C laterally extend towards the centre of the lower member 30 so as to be applied onto the front surface of the lower member 30.

The intermediate ribs 40B are positioned between the upper member 30 and the lower member 30.

The lower ribs 40D protrude vertically at the front of the uprights 28 in a region of the uprights 28 located just above the lower beam 29.

These front ribs 40A to 40D allow flexible energy absorption areas to be defined in front of the lateral regions of the members 30 and of the stiffer uprights 28, so that upon a median or lateral pedestrian impact, the deceleration remains below the standard value.

In alternatives, the single-piece shield 8 bears additional optical blocks (not shown), elements (not shown) for attaching panels of the skin of the shield, attachment elements (not shown) for a radiator grill, or driven flaps allowing them to be positioned behind the radiator grill in order to guide air in an optimum way.

In the embodiment of the disclosure illustrated in FIGS. 1 to 4, the upper bumper beam 24 is substantially positioned at the height of the main longitudinal members 12.

According to an alternative, the upper bumper beam 24 may be shifted vertically relatively to the main longitudinal members 12. It is for example positioned at a height of less than or at a height greater than that of the main longitudinal members 12.

According to another alternative of the present disclosure, the bumper shield 8 is a rear bumper shield adapted to be arranged at the rear end of the rear portion of the chassis of the vehicle.

The invention claimed is:

1. A bumper shield for a motor vehicle comprising two main longitudinal members, two auxiliary longitudinal members positioned at a lower height, as well as supporting and attachment plates positioned between the ends of the longitudinal members, the bumper shield configured such that it is a single integral piece made of a plastic material and formed of two uprights and an upper beam connecting the uprights, the uprights being configured to bear upon the plates, the plates extending in a continuous structure between the main and auxiliary longitudinal members such that the uprights act as impact absorbers.

2. The bumper shield according to claim 1, wherein the upper beam is substantially at the height of the main longitudinal members.

3. The bumper shield according to claim 1, wherein the upper beam is positioned at a height substantially different from that of the main longitudinal members.

4. The bumper shield according to claim 1, wherein the uprights have a thickness comprised between 120 and 220 mm.

5. The bumper shield according to claim 1, wherein the uprights have a cellular structure formed with cells extending longitudinally through the uprights and opening onto the rear and/or front face of the shield.

6. The bumper shield according to claim 5, wherein each upright comprises first blind cells, closed on the rear face side and open on the front face side, and second blind cells open on the rear face side and closed on the front face side.

7. The bumper shield according to claim 1, wherein the upper bumper beam is double and comprises two vertically spaced cross-members.

8. The bumper shield according to claim 1, further comprising at least one pedestrian absorption rib protruding outwards from an upright.

9. A bumper assembly of a motor vehicle comprising two main longitudinal members and two auxiliary longitudinal members positioned at a lower height, and supporting and attachment plates positioned at the ends of the longitudinal members, and further comprising a bumper shield according to claim 1, the uprights being attached and rigidly bearing against the plates.

10. The bumper assembly according to claim 9, wherein the uprights are attached to the plates by screwing and/or adhesive bonding.

11. The bumper assembly according to claim 9, wherein each upright is applied onto a respective one of the plates substantially along a whole of a height of the upright.

12. The bumper assembly according to claim 9, further comprising a lower beam extending transversely between the auxiliary longitudinal members and distinct from the bumper shield.

13. The bumper assembly according to claim 12 wherein a pedestrian absorption rib extends laterally and is applied on the upper beam.

14. The bumper assembly according to claim 9, wherein the bumper assembly is a front bumper assembly of a motor vehicle.

15. The bumper assembly according to claim 9, wherein the bumper assembly is a rear bumper assembly of a motor vehicle.

16. The bumper assembly according to claim 10, wherein each upright is applied onto a respective one of the plates substantially along a whole of a height of the upright.

17. The bumper assembly according to claim 10, further comprising a lower beam extending transversely between the auxiliary longitudinal members and distinct from the bumper shield.

18. The bumper assembly according to claim 11, further comprising a lower beam extending transversely between the auxiliary longitudinal members and distinct from the bumper shield.

19. The bumper assembly according to claim 12, further comprising at least one pedestrian absorption rib extending transversely between auxiliary longitudinal members and protruding outwards from one of the uprights.

20. The bumper shield according to claim 1, wherein the shield is configured in the shape of an H or an inverted U defined by the uprights and the upper beam.

* * * * *